United States Patent
Matsuo et al.

(10) Patent No.: US 10,361,526 B2
(45) Date of Patent: *Jul. 23, 2019

(54) RECTANGULAR ROLLED COPPER FOIL, FLEXIBLE FLAT CABLE, ROTARY CONNECTOR, AND METHOD OF MANUFACTURING RECTANGULAR ROLLED COPPER FOIL

(71) Applicants: Furukawa Electric Co., Ltd., Tokyo (JP); Furukawa Automotive Systems Inc., Shiga (JP)

(72) Inventors: Ryosuke Matsuo, Tokyo (JP); Kengo Mitose, Tokyo (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,188

(22) Filed: Sep. 27, 2017

(65) Prior Publication Data

US 2018/0019559 A1    Jan. 18, 2018

Related U.S. Application Data

(63) Continuation of application No. PCT/JP2016/059075, filed on Mar. 23, 2016.

(30) Foreign Application Priority Data

Apr. 1, 2015   (JP) .................................. 2015-075366

(51) Int. Cl.
    *B21C 37/00*    (2006.01)
    *H01R 35/02*    (2006.01)
    (Continued)

(52) U.S. Cl.
    CPC ............. *H01R 35/025* (2013.01); *B21B 1/40* (2013.01); *B21B 3/00* (2013.01); *C22C 9/00* (2013.01);
    (Continued)

(58) Field of Classification Search
    None
    See application file for complete search history.

(56) References Cited

U.S. PATENT DOCUMENTS

2002/0094700 A1 *   7/2002   Kato ..................... B60R 16/027
                                                                439/15
2004/0166017 A1 *   8/2004   Caron ...................... C22C 9/00
                                                                420/492

(Continued)

FOREIGN PATENT DOCUMENTS

CN      103080347 A      5/2013
EP      2508631 A1       10/2012
(Continued)

OTHER PUBLICATIONS

English Translation of International Preliminary Report on Patentability Chapter I in PCT Application No. PCT/JP2016/059075 (WO2016/158589), dated Oct. 3, 2017.

(Continued)

*Primary Examiner* — Seth Dumbris
(74) *Attorney, Agent, or Firm* — Dorsey & Whitney LLP

(57) ABSTRACT

A rectangular rolled copper foil includes copper or a copper alloy having a 0.2% yield strength of greater than or equal to 250 MPa. In a cross section perpendicular to a rolling direction, an area ratio of crystal grains oriented at a deviation angle of less than or equal to 12.5° from a Cube orientation is greater than or equal to 8%.

6 Claims, 4 Drawing Sheets

(51) Int. Cl.
    *B21B 1/40*    (2006.01)
    *C22C 9/00*    (2006.01)
    *C22C 9/02*    (2006.01)
    *C22C 9/04*    (2006.01)
    *C22C 9/10*    (2006.01)
    *C22F 1/08*    (2006.01)
    *H01B 1/02*    (2006.01)
    *H01B 5/02*    (2006.01)
    *H01B 13/00*    (2006.01)
    *B21B 3/00*    (2006.01)
    *H01R 43/04*    (2006.01)
    *C22F 1/00*    (2006.01)

(52) U.S. Cl.
CPC .................. *C22C 9/02* (2013.01); *C22C 9/04* (2013.01); *C22C 9/10* (2013.01); *C22F 1/08* (2013.01); *H01B 1/02* (2013.01); *H01B 5/02* (2013.01); *H01B 13/00* (2013.01); *H01R 43/04* (2013.01); *B21B 2003/005* (2013.01); *C22F 1/00* (2013.01); *Y10T 428/12431* (2015.01); *Y10T 428/12438* (2015.01)

(56) References Cited

U.S. PATENT DOCUMENTS

| | | |
|---|---|---|
| 2013/0008692 A1 | 1/2013 | Kimura et al. |
| 2014/0011374 A1 | 1/2014 | Adachi et al. |
| 2014/0193293 A1* | 7/2014 | Shishido .................. C22C 1/10 420/473 |

FOREIGN PATENT DOCUMENTS

| | | |
|---|---|---|
| EP | 2610359 A1 | 7/2013 |
| JP | 3009383 B2 | 2/2000 |
| JP | 2009-048819 A | 3/2009 |
| JP | 2010-275640 A | 12/2010 |
| JP | 2011-017072 A | 1/2011 |
| JP | 2012126933 A | 7/2012 |
| JP | 2013-047360 A | 3/2013 |
| JP | 2013-163853 A | 8/2013 |
| JP | 5654025 B2 | 1/2015 |
| WO | 2011068121 A1 | 6/2011 |
| WO | 2012026611 A1 | 3/2012 |

OTHER PUBLICATIONS

English Translation of the Written Opinion of the International Search Authority in PCT Application No. PCT/JP2016/059075 (WO2016/158589), dated May 17, 2016.

International Search Report and Written Opinion for PCT Application No. PCT/JP2016/059075, dated May 17, 2016 (Including English translation of ISR).

Communication pursuant to Rule 164(1) EPC with the Supplementary Partial European Search Report dated Aug. 1, 2018 for European Application No. 16772470.7, 19 pages.

Extended European Search Report dated Dec. 19, 2018 in the corresponding European Application No. 16772470.7.

English Translation of 'Metal Material and Heat Treatment', Lijiang Zhu, p. 272, Beijing Institute of Technology press, Jul. 2011.

English Translation of Notification of the First Office Action dated Sep. 18, 2018 in a corresponding Chinese Application No. 201680012827.1.

Fenqin, Zhang, "Civil Engineering Materal"(Engl. Translation), New Series of Textbooks for Civil Engineering Majors in Ordinary Colleges and Universities, The China Railway Press, 2008. 10 p. 128.

English Translation of Corresponding CN Application No. 201680012827.1 2nd Office Action dated Mar. 11, 2019.

English Translation of Notification of Reason for Refusal dated May 20, 2019 in the corresponding KR Application No. 10-2017-7024479.

* cited by examiner

RECTANGULAR ROLLED COPPER FOIL, FLEXIBLE FLAT CABLE, ROTARY CONNECTOR, AND METHOD OF MANUFACTURING RECTANGULAR ROLLED COPPER FOIL

CROSS REFERENCE TO RELATED APPLICATIONS

This is a continuation application of International Patent Application No. PCT/JP2016/059075 filed Mar. 23, 2016, which claims the benefit of Japanese Patent Application No. 2015-075366, filed Apr. 1, 2015, the full contents of all of which are hereby incorporated by reference in their entirety.

BACKGROUND

Technical Field

The present disclosure relates to a rectangular rolled copper foil comprising copper or a copper alloy, a flexible flat cable, a rotary connector, and a method of manufacturing the same, and particularly relates to a rectangular rolled copper foil used for flexible flat cables or the like subjected to repeated bending motions in automotive components or the like and a method of manufacturing the same.

Background

Flexible flat cables (FFCs) have features such as a reduced thickness and an excellent flexibility, and thus conventionally used for various applications due to their high degree of freedom in the mounting mode to electronic devices or the like. For example, flexible flat cables are widely used in applications such as a wiring of a rotary connector also called a steering roll connector (SRC), which is a component of an air bag system in automobiles, a foldable section of foldable cell-phones, a movable part of digital cameras, printer heads, or the like, and a movable part of disc associated devices including HDDs (Hard Disk Drives), DVDs (Digital Versatile Discs), Blu-ray® Discs, and CDs (Compact Discs). A rolled copper foil is generally used for a conductor portion of such flexible flat cables.

The rolled copper foil is a copper foil manufactured by rolling. The rolled copper foil includes a rolled copper foil obtained by rolling a round wire (in the present specification, referred to as round wire rolled copper foil) and a rolled copper foil obtained by rolling an ingot to form a foil material without forming a round wire and then, if necessary, conducting a slitting process to obtain a predetermined width (in the present specification, referred to as rectangular rolled copper foil).

For example, in the SRCs, downsizing and thinning are required from the viewpoint of space-saving and cost reduction, and it is presumed that the tendency will be increasingly strengthened in the future. As a result, there is a tendency that the bend radii of the FFCs become even smaller than those of FFCs of the related art and a sufficient durability cannot be obtained by rolled copper foils of the related art.

Japanese Laid-Open Patent Publication No. 2009-048819 discloses a conductor in which the tensile strength (TS) is controlled to be between 350 MPa and 400 MPa, the conductor having a high flexing property under an environment of 85° C. or higher. In addition, Japanese Patent No. 3009383 discloses, although for an FPC application, a conductor capable of greatly improving the flexing property when recrystallization treatment is conducted by heat treatment under a certain condition.

However, Japanese Laid-Open Patent Publication No. 2009-048819 does mention durability against temperature, but, as to a bending property, merely discloses the durability through a test with a bend radius of 7.5 mm in Examples, and the bending property at a bend radius of smaller than 7.5 mm is not mentioned and unknown. In addition, in Japanese Patent No. 3009383, a durability test at an extremely small bend radius is carried out, but the flex life cycle in the test is 100000 or less and therefore does not meet the bending property that is required for the SRCs. Accordingly, it cannot be said that the conductors manufactured by the manufacturing methods disclosed in the cited references can satisfy the required properties at a small bend radius required for the SRCs.

The present disclosure is related to providing a rectangular rolled copper foil, a flexible flat cable, and a rotary connector which are capable of realizing an excellent flex resistance at a small bend radius (for example, less than or equal to 6 mm), and a method of manufacturing the rectangular rolled copper foil.

The present inventors have conducted various studies and as a result, have obtained the following findings. First, it has been conventionally considered that soft copper (copper or copper alloy having 0.2% yield strength of less than 250 MPa) has better properties than hard copper (copper or copper alloy having 0.2% yield strength of greater than or equal to 250 MPa) in terms of the flex life cycle, and the soft copper has been used industrially, but a phenomenon has been confirmed that the flex resistance of the hard copper becomes better than that of the soft copper as the bend radius in the required properties becomes smaller. For example, it has been found that the hard copper has better properties than the soft copper when the bend radius is extremely small, as small as about 6 mm.

Further, it has been made clear that it is difficult to achieve a good flex resistant property, for example, such as a flex life cycle of 500000 times or more at a bend radius of less than or equal to 6 mm, which is required for rotary connectors (for example, SRCs) by merely using the hard copper in place of the soft copper and further devisal is needed.

Thus, the present inventors have further conducted assiduous studies and as a result, have found that when crystal grains are accumulated at an area ratio of greater than or equal to 8% in a Cube orientation {001}<100> in a cross section perpendicular to a rolling direction in a metal structure of a copper foil being a product, a good flex resistant property can be obtained even though the bend radius is extremely small on the premise of the hard copper (0.2% yield strength of greater than or equal to 250 MPa). In addition, it has also been found that in a case where crystal orientation control is introduced to a rolled copper foil, the rectangular rolled copper foil is more advantageous than the round wire rolled copper foil in terms of manufacturing stability.

Note that the rectangular rolled copper foil in the present disclosure is, as described above, a copper foil obtained by the manufacturing method in which an ingot is rolled to form a foil material, and preferably, the foil material is further slit.

SUMMARY

According to a first aspect of the present disclosure, a rectangular rolled copper foil comprises or consists of copper or a copper alloy having a 0.2% yield strength of greater than or equal to 250 MPa, and, in a cross section perpendicular to a rolling direction, an area ratio of crystal grains oriented at a deviation angle of less than or equal to 12.5° from a Cube orientation is greater than or equal to 8%.

According to a second aspect of the present disclosure, a method of manufacturing a rectangular rolled copper foil comprising copper or a copper alloy having a 0.2% yield strength of greater than or equal to 250 MPa, wherein, in a cross section perpendicular to a rolling direction, an area ratio of crystal grains oriented at a deviation angle of less than or equal to 12.5° from a Cube orientation is greater than or equal to 8%, includes, after performing casting, hot rolling, first cold rolling, and a first heat treatment with recrystallization in this order, performing second cold rolling at a reduction of area of greater than or equal to 75% to form a foil material, performing a second heat treatment to the foil material between 200° C. and 600° C. for 1 second to 2 hours, and performing third cold rolling of cold rolling the foil material after the second heat treatment at a reduction of area of greater than or equal to 5% to form a foil material.

According to the present disclosure, even in a case where an FFC conductor is repeatedly bent at a small bend radius, a rectangular rolled copper foil having an excellent flex resistance can be provided. Accordingly, the rectangular rolled copper foil of the present disclosure can be used for an SRC equipped with an FFC and also wiring of a foldable section of cell-phones, a movable part of digital cameras, printer heads, or the like, and a movable part of disk associated equipment such as HDDs, and DVDs, Blu-ray® Disc, and CDs.

DETAILED DESCRIPTION

Further features of the invention will become apparent from the following detailed description of exemplary embodiments with reference to the attached drawings.

Figure 1:
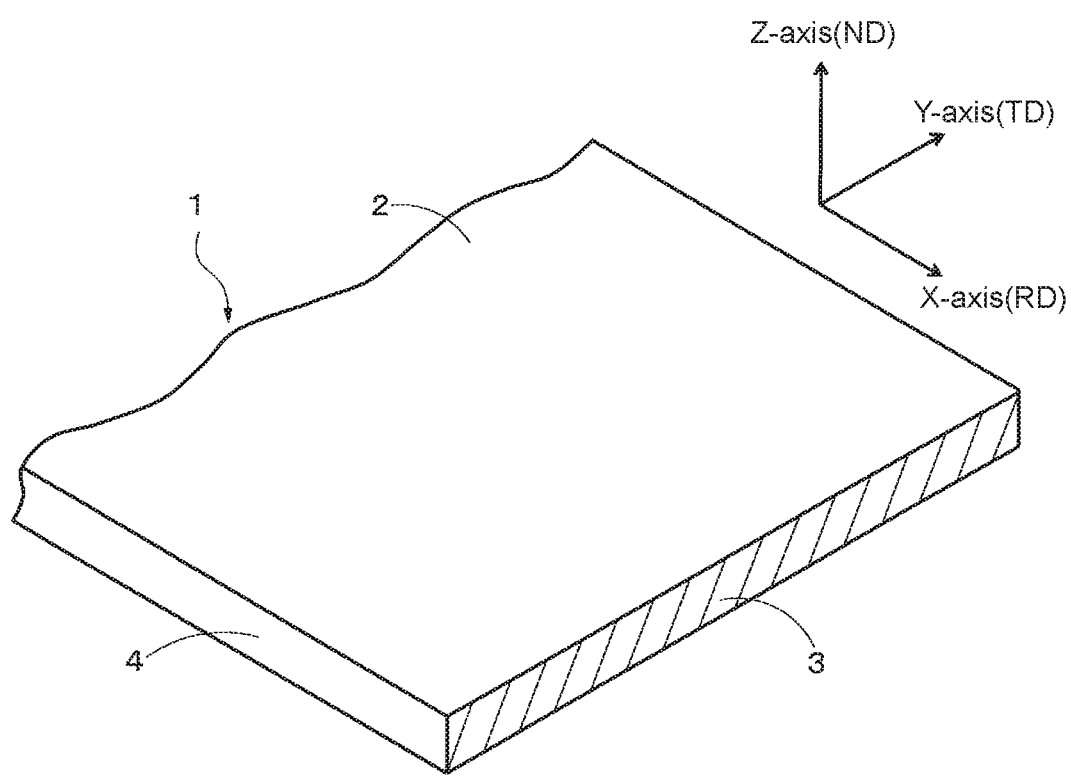
FIG. 1 is a perspective view (partial cross sectional view) showing a rectangular rolled copper foil of one embodiment of the present disclosure.

FIG. 1 shows a rectangular rolled copper foil 1 of one example of the present embodiment.
(Rectangular Rolled Copper Foil)

As shown in FIG. 1, a rectangular rolled copper foil 1 has a rolled surface 2 and side surfaces 4 adjacent thereto.

In FIG. 1, X-Y-Z axes define a rectangular coordinate system. X-axis represents RD that is a rolling direction and also a longitudinal direction of the copper foil; Z-axis represents ND that is a normal direction of rolling, which is a direction perpendicular to the rolled surface, and also a sheet thickness direction of the copper foil; and Y-axis represents ID that is a direction perpendicular to both RD and ND and also a transverse direction of the copper foil. In addition, reference numeral 3 indicates a cross section perpendicular to the rolling direction RD and is also referred to as an RD surface.

Rolled copper foils are roughly classified into a round wire rolled copper foil and a rectangular rolled copper foil, and in the rectangular rolled copper foil 1, crystal grains can be stably oriented in a Cube orientation when controlling the crystal orientation in the manufacturing steps described later. It is considered that this is due to the reasons that the Cube orientation is oriented, though only slightly, during rolling, and a structure obtained by rolling serves as a side to be eroded preferentially when the crystal grains grow into the Cube orientation. In contrast, in the round wire rolled copper foil, there is a tendency that the crystal grains are easily oriented preferentially to another crystal orientation in the process of manufacturing and it is technically difficult to stably orient the crystal grains in the Cube orientation.

Thus, the rectangular rolled copper foil 1 is used in the present embodiment.

The width and thickness of the rectangular rolled copper foil 1 are not particularly limited and can be determined appropriately according to the application; however, it is preferable that the width be 0.300 to 2.000 mm, and the thickness be 0.010 to 0.200 mm.

Copper or a copper alloy used in the present embodiment is, for example, tough pitch copper (TPC), oxygen-free copper (OFC) or a copper alloy comprising or consisting of, one or two or more additional elements and the balance being copper and inevitable impurities. It is preferable that the copper alloy contains a total of less than or equal to 1.0% by mass of one or two or more additional elements selected from among 0.01 to 0.2% by mass of Mg, 0.01 to 0.5% by mass of Zn, 0.01 to 1.5% by mass of Sn, 0.01 to 0.1% by mass of Ag, 0.001 to 0.05% by mass of P, 0.1 to 0.5% by mass of Cr, 0.01 to 0.1% by mass of Si, 0.01 to 0.2% by mass of Zr, 0.01 to 0.2% by mass of Ti, and 0.01 to 0.2% by mass of Fe. The reason for the limitation of the additional elements will be described below.

<Additional Element>
(0.01 to 0.2% by Mass of Mg)

Mg is an element having an effect of improving the flexing property by forming a solid solution when added to Cu. To obtain such effect, it is preferable that an Mg content be greater than or equal to 0.01%. As the Mg content becomes larger, the flexing property is expected to be further enhanced, but electric conductivity may decrease and a desired resistance may not be satisfied, or there is a concern on an influence on the manufacturability such as cracks that occur during casting or hot rolling. Therefore, it is preferable that an upper limit value of the Mg content be 0.2% by mass.

(0.01 to 0.5% by Mass of Zn)

Zn is an element having an effect of improving the flexing property by forming a solid solution when added to Cu. To obtain such an effect, it is preferable that a Zn content be greater than or equal to 0.01% by mass. In addition, the effect cannot be expected to be further enhanced even if more than 0.5% by mass of Zn is contained. Therefore, it is preferable that an upper limit of the Zn content be 0.5% by mass.

(0.01 to 1.5% by Mass of Sn)

Sn is an element having an effect of improving the flexing property by forming a solid solution when added to Cu. To obtain such an effect, it is preferable that a Sn content be greater than or equal to 0.01% by mass. As the Sn content becomes larger, the flexing property is expected to be further enhanced, but electric conductivity may decrease and a desired resistance may not be satisfied. Therefore, it is preferable that an upper limit value of the Sn content be 1.5% by mass.

(0.01 to 0.1% by Mass of Ag)

Ag is an element having an effect of improving the flexing property by forming a solid solution when added to Cu. To obtain such an effect, it is preferable that an Ag content be greater than or equal to 0.01% by mass. As the Ag content becomes larger, the flexing property is expected to be further enhanced and the decrease in the electrical conductivity is small, but considering the balance with costs, it is preferable that an upper limit value be 0.1% by mass.

(0.001 to 0.05% by Mass of P)

P is an element having an effect of improving castability. To obtain such an effect, it is preferable that a P content be greater than or equal to 0.001% by mass. As the P content becomes larger, there is a tendency that the electric conductivity significantly decreases and therefore it is preferable that an upper limit value be 0.05% by mass.

(0.1 to 0.5% by Mass of Cr)

Cr is an element having an effect of improving the flexing property by precipitating finely, when added to Cu and subjected to an appropriate heat treatment. To obtain such an effect, it is preferable that the Cr content be greater than or equal to 0.1% by mass. Even if more than 0.5% by mass of Cr is contained, there is a tendency that an effect of improving the flexing property becomes not remarkable. Therefore, it is preferable that an upper limit value of the Cr content be 0.5% by mass.

(0.01 to 0.1% by Mass of Si)

Si is an element having an effect of improving the flexing property by precipitating finely, when added to Cu and subjected to an appropriate heat treatment. To obtain such an effect, it is preferable that a Si content be greater than or equal to 0.01% by mass. As the Si content becomes larger, the flexing property is expected to be further enhanced, but electric conductivity may decrease and a desired resistance may not be satisfied. Therefore, it is preferable that an upper limit value be 0.1% by mass.

(0.01 to 0.2% by Mass of Zr)

Zr is an element having an effect of improving the flexing property by precipitating finely when added to Cu and subjected to an appropriate heat treatment. To obtain such an effect, it is preferable that a Zr content be greater than or equal to 0.01% by mass. As the Zr content becomes larger, the flexing property is expected to be further enhanced, but there is a concern on an influence on the manufacturability, such as cracks that occur during casting or hot rolling. Therefore, it is preferable that an upper limit value be 0.2% by mass.

(0.01 to 0.2% by Mass of Ti)

Ti is an element having an effect of improving the flexing property by forming a solid solution when added to Cu. To obtain such an effect, it is preferable that a Ti content be greater than or equal to 0.01% by mass. As the Ti content becomes larger, the flexing property is expected to be further enhanced, but the electrical conductivity may decrease and the desired resistance may not be satisfied, or there is concern on an influence on the manufacturability such as cracks that occur during casting or hot rolling. Therefore, it is preferable that an upper limit value be 0.2% by mass.

(0.01 to 0.2% by Mass of Fe)

Fe is an element having an action of precipitating finely, when added to Cu and subjected to an appropriate heat treatment, thereby improving the flexing property. To allow the action to be exhibited, it is preferable that the Zr content be made greater than or equal to 0.01% by mass. In addition, there is a tendency that the effect of improving the flexing property does not become remarkable even when more than 0.2% by mass of Fe is contained, and therefore it is preferable that an upper limit value of Fe content be made 0.2% by mass.

(Containing Total of Less than or Equal to 1.0% by Mass of One or Two or More Additional Elements Selected from Among Mg, Zn, Sn, Ag, P, Cr, Si, Zr, Ti, and Fe)

The above additional element is added for the purpose of enhancing strength, heat resistance, and the manufacturability without lowering the electric conductivity too much, and it is preferable that the total amount added is less than or equal to 1.0% by mass. When the electric conductivity of the standard soft copper is 100%, it is preferable that the electric conductivity of the copper alloy be greater than or equal to 90%. In addition, it is known that addition of an element to Cu changes SFE (stacking fault energy), and accumulation in the crystal orientation changes due to the additional element. When the element is added too much, a desired texture cannot be obtained, and also from this point, it is preferable to control the amount of the additional trace element to be added. Note that the additional element is not limited to those described above as long as the purpose of addition can be achieved.

(Area Ratio of Crystal Grains Oriented at a Deviation Angle of Less than or Equal to 12.5° from Cube Orientation in Cross Section (RD Surface) Perpendicular to Rolling Direction being Greater than or Equal to 8%)

In the rectangular rolled copper foil 1 of the present embodiment, an area ratio of the crystal grains oriented at a deviation angle of less than or equal to 12.5° from the Cube orientation {001}<100> in the cross section perpendicular to the rolling direction is greater than or equal to 8%. The Cube orientation is one of orientations of a crystal in a matrix of copper or the copper alloy in the material (rectangular rolled copper foil). This orientation is a crystal orientation in which the (001) plane of a crystal (face centered cubic lattice) in the matrix of copper or the copper alloy is parallel to the rolled surface, and the <100> direction is parallel to the rolling direction RD. In the rectangular rolled copper foil of the present embodiment, crystals having this crystal orientation exist at an area ratio of greater than or equal to 8% when measured in the RD surface 3. However, when the deviation angle from the ideal crystal orientation is less than or equal to 12.5° (greater than or equal to 0° and less than or equal to 12.5°), the crystal orientation can be handled as equivalent to the ideal orientation, and therefore the orientation at a deviation angle of less than or equal to 12.5° from the Cube orientation can also be considered as equivalent to the Cube orientation. That is, the rectangular rolled copper foil of the present embodiment includes not only crystal grains that are strictly oriented in the Cube orientation but also crystal grains that are oriented in an orientation rotated three-dimensionally within plus or minus 12.5° from the Cube orientation, and such crystal grains exist at an area ratio of greater than or equal to 8% in the RD surface 3. Hereinafter, the Cube orientation or the orientation rotated three-dimensionally within plus or minus 12.5° from the Cube orientation is referred to as the "orientation at a deviation angle of less than or equal to 12.5° from the Cube orientation".

When a rolling treatment is applied, crystal grains in the orientation at a deviation angle of less than or equal to 12.5° from the Cube orientation decrease in the rolled material and therefore flex resistance slightly decreases, and on the other hand, a yield strength increases due to work hardening, and therefore the mechanical strength is improved. In addition, by performing a recrystallization heat treatment, the crystal grains in the orientation at a deviation angle of less than or equal to 12.5° from the Cube orientation develop and the flex resistance is improved. Accordingly, in the present embodiment, a focus is made on the area ratio of the crystal grains in the orientation at a deviation angle of less than or equal to 12.5° from the Cube orientation in the RD surface 3 in the rolled copper foil. Considering the area ratio, the rolling treatment and a recrystallization treatment are performed under a predetermined condition to make the 0.2% yield strength greater than or equal to 250 MPa, and to make the range of a numerical value of the area ratio greater than or equal to 8%, thereby representing a degree of accumulation of the crystal grains in the orientation at a deviation angle of less than or equal to 12.5° from the Cube orientation. Thereby, the timing of the occurrence of an uneven shape that occurs due to sliding and becomes an origin of fracture can be delayed, and the propagation of cracks can be delayed by decreasing Young's modulus. In this way, the rectangular rolled copper foil 1 of the present embodiment can satisfy not only an excellent mechanical strength property but also a flex resistant property. From these viewpoints, in the present embodiment, the area ratio of the crystal grains oriented in the orientation at a deviation angle of less than or equal to 12.5° from the Cube orientation in the RD surface 3 is greater than or equal to 8%, preferably greater than or equal to 10%. In addition, an upper limit of a numerical range of the area ratio does not exist particularly. However, in a case where a slitting process is conducted, it is preferable that the upper limit be about 90% in order to make the slitting process easy in consideration of the fact that the rectangular rolled copper foil of the present embodiment is hard copper.

The crystal orientation will now be described further. The metal material is usually a polycrystalline material, and when the rectangular rolled copper foil is manufactured by repeating rolling a plurality of times, crystals in the foil accumulate in a particular orientation. A state of such a metal structure accumulated in a certain orientation is referred to as a texture. To discuss an aspect of the texture, a coordinate system for defining a direction of a crystal is required. Thus, in the present specification, as mentioned above, in conformity with a general notation of a texture, a rectangular coordinate system is used in which X-axis represents the rolling direction (RD) in which the rectangular rolled copper foil is rolled and progresses, Y-axis represents the transverse direction (TD) of the rectangular rolled copper foil, and Z-axis represents a rolled surface normal direction (ND) which is perpendicular to the rolled surface of the rectangular rolled copper foil. An orientation of a certain single crystal grain existing in the rectangular rolled copper foil is expressed as (hkl)[uvw] using a Miller index (hkl) of a crystal plane which is perpendicular to the Z-axis (parallel to rolled surface) and an index [uvw] in a crystal direction parallel to the X-axis. For example, the orientation is shown as (132)[6-43] or (231)[3-46], and (132)[6-43] indicates that a (132) plane of a crystal constituting the crystal grain is perpendicular to ND, and a [6-43] direction of the crystal constituting the crystal grain is parallel to RD. Note that (132)[6-43] and (231)[3-46] are equivalent due to a symmetric property of the face centered cubic lattice. A group of orientations having such an equivalent orientation is shown as {132}<643> using parenthesis notations ({ } and < >) to indicate the family.

Note that the crystal orientation (hkl)[uvw] itself uniquely determines an orientation of a crystal, and does not depend on a viewing direction. In other words, a crystal orientation can be measured by measurement from any direction among the rolling direction (RD), the rolled surface normal direction (ND), and the transverse direction (TD) of the copper foil.

However, in the present disclosure, since an amount of existence of crystal grains oriented substantially in the Cube orientation is specified as an area ratio, a specific observation surface is necessary.

Thus, in the present disclosure, crystal grains are observed on the RD surface 3, and an area ratio in this observation surface is measured. More specifically, in the entirety of the RD surface 3, the orientation at a deviation angle of less than or equal to 12.5° from the Cube orientation is measured and an area thereof is calculated by imaging analysis, and an area ratio thereof is obtained by dividing the area having the orientation by the total area of the RD surface 3.

It is preferable that the imaging analysis of the crystal orientation in the present disclosure be conducted using an EBSD method. EBSD is an abbreviation for Electron Back Scatter Diffraction (electron back scatter diffraction), which is a crystal orientation analysis technique utilizing a back-scattered electron Kikuchi line diffraction (Kikuchi pattern) that is produced when a sample is irradiated with an electron beam in a Scanning Electron Microscope (SEM). Note that the Kikuchi pattern refers to a pattern that appears behind an electron beam diffraction image as a pair of black and white parallel lines, or in a belt shape or an array shape when an electron beam that has hit a crystal scatters to be diffracted. In the present disclosure, a 500-μm square sample area including 200 crystal grains or more is scanned at a 0.5-μm step, and a crystal orientation is analyzed using software for analysis (manufactured by EDAX TSL corporation, trade name "Orientation Imaging Microscopy v5"). In the analysis, restrictions of IQ (image quality)≥900 and CI (reliability index)≥1.0 were set for the objects in order to remove distortion and noise information. Note that in EBSD measurement, it is necessary to remove foreign matters adhered to the surface to be measured after mechanical polishing and, at the same time, to mirror-finish the surface in order to obtain a clear Kikuchi line diffraction image. In the present examples, a polishing process is performed on the surface to be measured by a CP (cross section polisher) process or by electrolytic polishing.

Note that by observing the surface of the rolled surface 2, the rolling direction of the rectangular rolled copper foil 1 can be specified even in a state of a product from a state of roll marks due to rolling.

(0.2% Yield Strength being Greater than or Equal to 250 MPa)

The rectangular rolled copper foil in the present embodiment is so-called hard copper and has a 0.2% yield strength of greater than or equal to 250 MPa.

(Keeping 0.2% Yield Strength of Greater than or Equal to 250 MPa after Conducting Heat Treatment Under Condition of Allowing Larson-Miller Parameter P to be within Range of 7000 to 9000)

It is preferable that the rectangular rolled copper foil of the present embodiment have a 0.2% yield strength of greater than or equal to 250 MPa even after conducting a heat treatment under a condition of allowing the Larson-Miller parameter P to be within a range of 7000 to 9000, wherein the Larson-Miller parameter P is obtained based on a Larson-Miller Parameter method which is well known as an acceleration test of creep rupture. The Larson-Miller parameter is defined by the following expression (1) and is used for estimating the lifetime of a material by evaluating thermal energy which the material receives when the values of the temperature and the time are changed is equivalent.

$$P = T(C + \log t_r) \quad (1),$$

where, T represents absolute temperature (K), $t_r$ represents rupture time (h), and C represents a material constant (=20).

Keeping the 0.2% yield strength of greater than or equal to 250 MPa even after conducting the heat treatment under the condition where the Larson-Miller parameter P is within a range of 7000 to 9000 can be achieved by introducing a lattice defect in the structure of the matrix of the rectangular rolled copper foil 1.

The average crystal particle diameter of the rectangular rolled copper foil in the present embodiment is, for example, 1 μm to 10 μm. In a case where the crystal particle diameter is uniform to a certain extent, the yield strength can be controlled by the amount of the lattice defect. Thus, in the present embodiment, the amount of rolling in the steps of manufacturing the rectangular rolled copper foil 1 is controlled, thereby controlling the amount of the lattice defect to be introduced in the structure of the matrix in controlling the amount of rolling, and a desired yield strength can be obtained by introducing a large number of lattice defects.

(Method of Manufacturing Rectangular Rolled Copper Foil According to Present Embodiment)

The rectangular rolled copper foil 1 of the present embodiment can be manufactured, for example, after a casting step, a hot rolling step, a first cold rolling step, and a first heat treatment step with recrystallization are performed in this order, through the steps of [1] a second cold rolling step, [2] a second heat treatment step (first annealing treatment step), [3] a third cold rolling step, and [4] a third heat treatment step (second annealing treatment step). Note that when the properties according to the present disclosure are satisfied after the third cold rolling step [3] is completed, the third heat treatment step [4] needs not to be conducted.

Hereinafter, the steps [1] to [4] will be described.

Prior to conducting the above steps [1] to [4], a foil material is formed, for example, by conducting casting into a cake-like copper ingot having a thickness of around 150 mm (casting step), conducting hot rolling (hot rolling step) until the thickness reaches around 15 mm, further, conducting cold rolling (first cold rolling step) until the thickness reaches 0.08 to 3.5 mm in the first cold rolling step, and then conducting a heat treatment with recrystallization and precipitation (first heat treatment step). As a range of the heat treatment condition in the first heat treatment step in the disclosure, it is preferable to conduct the first heat treatment step between 200° C. and 600° C. for 1 second to 2 hours.

[1] Second Cold Rolling Step

After the foil material is recrystallized in the first heat treatment step, the second cold rolling is performed at a reduction of area of 45 to 98% until the thickness reaches 0.036 to 0.7 mm (second cold rolling step). With respect to a range of the reduction ratio in the present rolling step in the disclosure, it is preferable that the reduction of area be made greater than or equal to 75% in order to cause a desired structure to be developed by the heat treatment later. Thereby, the lattice defect is introduced in the metal structure of the foil material by rolling, so that the strength (for example, 0.2% yield strength) can be improved.

[2] Second Heat Treatment Step (First Annealing Treatment Step)

The second heat treatment step is conducted for performing a final recrystallization treatment to the foil material that has been cold rolled to 0.036 to 0.7 mm in the second cold rolling step. With respect to a range of the heat treatment condition in the present step in the disclosure, it is preferable to conduct the heat treatment between 200° C. and 600° C. for 1 second to 2 hours.

[3] Third Cold Rolling Step

A foil material is formed by performing rolling to a foil material (plate-shaped wire foil material) having a thickness of 0.05 mm until the thickness reaches 0.035 mm in order to make a final shape. The reduction of area (draft) to obtain a final thickness is greater than or equal to 5%. An upper limit of the reduction of area is not limited but is desired to be less than or equal to 80% regarding pure copper-based copper foil (conductor) that is assumed to be softened such that the 0.2% yield strength is less than 250 MPa by heating when the rectangular rolled copper foil is laminated with other plate materials.

[4] Third Heat Treatment Step (Second Annealing Treatment Step)

The present step is for performing stress relief annealing to the foil material, and whether to carry out the step or not is optional. However, this annealing, when carried out, is accompanied by lowering of the strength and therefore must be conducted to such an extent that can keep the 0.2% yield strength of greater than or equal to 250 MPa. With respect to the heat treatment condition in the present step, it is preferable to conduct the heat treatment at 150 to 300° C. for 1 second to 2 hours. The present step may be omitted in a case where there is a margin in a product specification and the product performance is satisfied after the completion of the above third cold rolling step [3], that is, after the completion of finish rolling.

[5] Slitting Step

After the step [3] or [4], by performing a slitting process in which the foil material is cut along the rolling direction, a plurality of rectangular rolled copper foils 1 each having a certain width can be obtained from one sheet of a foil material. Here, the plurality of rectangular rolled copper foils 1 are cut in a uniform width of 0.300 to 2.000 mm. The present slitting step is optional and is selected and performed depending on the application of the end product.

The side surfaces 4 of the rectangular rolled copper foil 1 through the present step are sheared surfaces, but in a case where a product is made without being subjected to the present step, the side surfaces 4 are not sheared surfaces.

Note that the manufacturing process mentioned above is an example of a process for satisfying the scope of the disclosure, and the manufacturing method of the present disclosure is not limited thereto.

(Configuration of Conductor for Flexible Flat Cable (FFC) Using Rectangular Rolled Copper Foil According to Present Embodiment)

The rectangular rolled copper foil 1 produced by the above manufacturing method is a plate-shaped or foil-shaped conductor for an FFC, the conductor being formed of TPC, OFC, or a copper alloy to which an additional element is added and obtained by performing the rolling step and the heat treatment (recrystallization treatment) step once or a plurality of times. In this rectangular rolled copper foil, the 0.2% yield strength is greater than or equal to 250 MPa, and the area ratio of the crystal grains oriented at a deviation angle of less than or equal to 12.5° from the Cube orientation in the cross section perpendicular to the rolling direction of the rectangular rolled copper foil is greater than or equal to 8%. Thereby, even in a case where bending motion at a bend radius of less than or equal to 6 mm are repeated, the flex life cycle can be made 500000 times or more, and an excellent flex resistance can be realized. In addition, by manufacturing an FFC or SRC obtained by laminating the above conductor, the lifetime of the conductor formed in the FFC or SRC is improved.

The width of the conductor for an FFC is usually 0.8 mm to 2 mm, and since the flex resistance can be improved with the rectangular rolled copper foil of the present disclosure, the width of the conductor for an FFC can be narrowed to about 0.3 mm to about 1.1 mm, and lowering the height of the SRC can be realized by narrowing the width of the FFC itself. In addition, in a case where a value of the whole width of the SRC is made the same as that in SRCs of the related art, the number of channels can be increased more than the number of channels in SRCs of the related art by arranging in a transverse direction a plurality of conductors for an FFC each having the same width. By realizing the downsizing of an SRC in this way, further enhanced effects can be obtained.

(Configuration of FFC Using Rectangular Rolled Copper Foil According to Present Embodiment)

Figure 3:
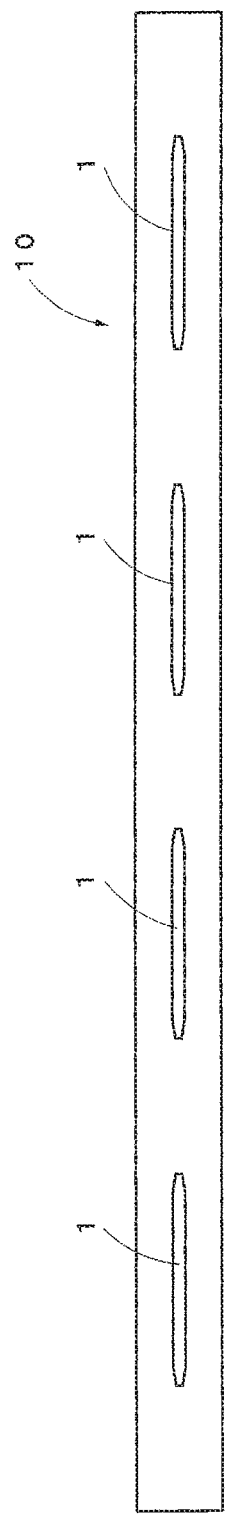
FIG. 3 is a cross sectional view showing an FFC manufactured using four rectangular rolled copper foils of another embodiment of the present disclosure.

By conducting a so-called laminating process treatment in which a laminate resin is disposed at both surfaces of the above rectangular rolled copper foil 1 to apply heat, an FFC in which an outer periphery of a rectangular conductor is covered with the resin can be obtained. Particularly, by setting the heat treatment condition so that the Larson-Miller parameter P is within a range of 7000 to 9000 in the lamination treatment, it is made possible to allow a rectangular rolled conductor inside the FFC to keep a state where the requirements of the present disclosure are satisfied. FIG. 3 shows an example of a cross section of an FFC obtained in such a way that in a state where four rectangular rolled copper foils are disposed at a predetermined interval, both surfaces of each rectangular copper foil are covered with the resin by lamination.

(Configuration of Rotary Connector (SRC) Using FFC According to Present Embodiment)

Figure 4:
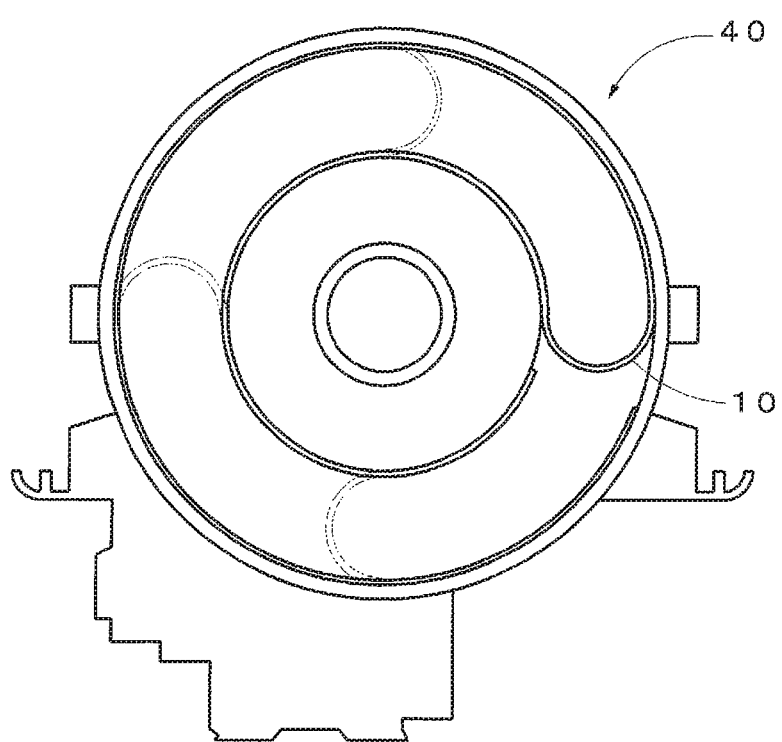
FIG. 4 is a diagram showing an attaching state where an FFC of one embodiment of the present disclosure is applied to a rotary connector (SRC) that is a component of an air bag system in an automobile.

As the present embodiment, in a case where the FFC of the present embodiment is applied in the structure of a well-known SRC (for example, those described in Japanese Patent No. 5654025), breakage of the FFC can be prevented and the lifetime as an SRC can be made long even in a case where a bent portion having a bend radius of less than or equal to 6 mm exists in a portion where the FFC is applied because of the downsizing of the SRC or a U-turn of the FFC inside the SRC. FIG. 4 shows an attaching state where the FFC of the present embodiment is applied to a rotary connector (SRC) of an air bag system in an automobile.

The rectangular rolled copper foil 1 according to the present embodiment and the manufacturing method thereof, and the flexible cable (FFC) and the rotary connector (SRC) have been mentioned herein above. However, the present disclosure is not limited to the described embodiments, and various modifications and changes can be conducted based on the technical ideas of the present disclosure.

EXAMPLES

Hereinafter, the present disclosure will be described in more detail based on Examples. However, the present disclosure is not limited to these Examples.

Examples 1 to 24

First, a TPC ingot cast to have a thickness of 150 mm was hot rolled to a thickness 15 mm, then cold rolled to make the thickness 1 mm, and further, a softening heat treatment with recrystallization was performed. Subsequently, in the second cold rolling step, cold rolling was performed at a reduction of area as shown in Table 1, and then in the second heat treatment step, a heat treatment was performed at a heating temperature for a retention time as shown in Table 1. Subsequently, in the third cold rolling step, cold rolling was performed at a reduction of area as shown in Table 1, and then, further in the third heat treatment step, quench and temper heat treatment was performed under a condition of the Larson-Miller parameter P as shown in Table 1 for Examples 2 and 4 to 20 to obtain each copper foil. Further, these copper foils were each subjected to a slitting step to be cut along the rolling direction for the purpose of forming a conductor (copper foil) having a major width of 0.5 mm, 0.8 mm, 1.1 mm, or 1.4 mm, the conductor expected to be used as an FFC conductor, thereby manufacturing rectangular rolled copper foils each having a predetermined width.

Comparative Examples 1 to 7

Copper foils were manufactured based on the manufacturing method in the above Examples by changing the order of steps or treatment conditions in the steps to the contents as shown in Table 1.

Next, the following tests/evaluation were conducted for the samples manufactured by way of trial in the above Examples and Comparative Examples.

(Flex Resistance Test)

Figure 2:
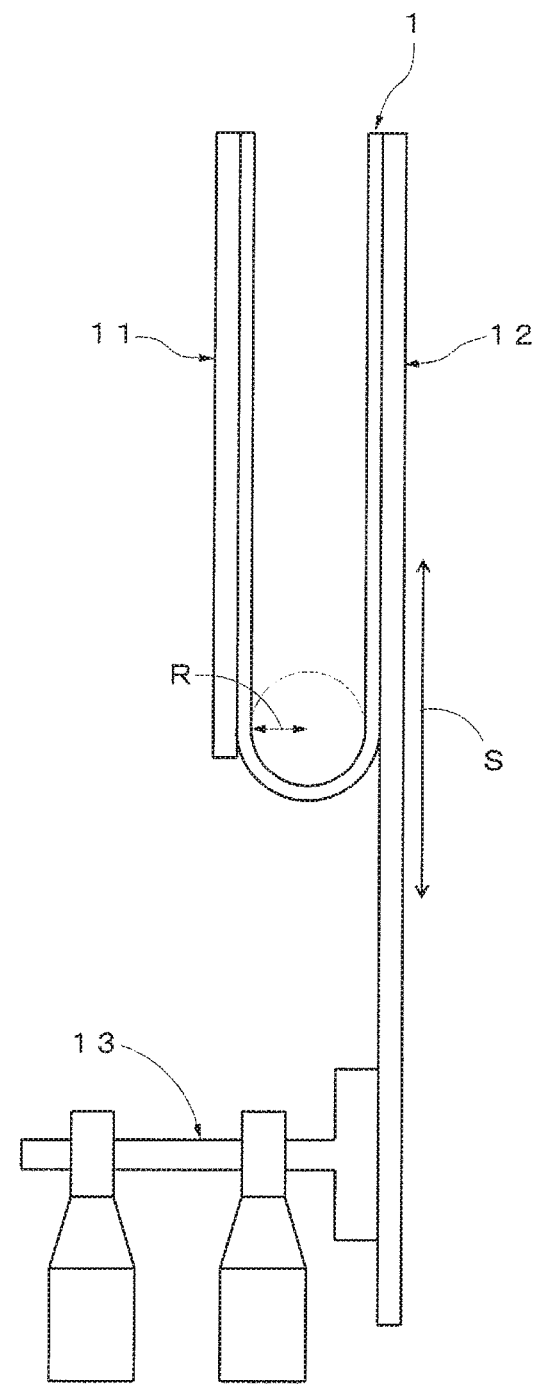
FIG. 2 is a side view schematically showing a state where a rectangular rolled copper foil is fixed to a bending tester used in a flex resistance test in Examples of the present disclosure.

As shown in FIG. 2, a bending test was conducted using an FPC bending tester (manufactured by Ueshima Seisakusho Co., Ltd., device name "FT-2130") by fixing the rectangular rolled copper foil 1 to a sample fixing plate 11 and a movable plate 12, and moving the movable plate 12 with a motor section 13.

The present flex resistance test was conducted with the rectangular rolled copper foil as a single body. The testing condition was as follows: tests were each conducted under different conditions of a bend radius R of 5.5 mm and a bend radius R of 7.5 mm (R in the figure); stroke S: ±13 mm (S in the figure); ambient temperature: 85° C.; rotational speed: 180 rpm; and a threshold value of the lifetime of a copper foil was defined as a numerical value obtained when the resistance value increased by 3Ω from the initial resistance value (initial resistance value+3Ω), and the bending test was repeated until the resistance value reached the threshold value to measure the number of bends at the time. Note that with respect to the number of bends, a reciprocation in the stroke S of the above movable plate was counted as one. Evaluation criteria are as follows: the number of bends of 500000 times or more, by which the lifetime of an FFC conductor is considered to be sufficient as a product specification, is considered as a pass and is shown as "Acceptable" in Table 1; and the number of bends of less than 500000 times, with which there is a possibility that the lifetime of an FFC conductor does not satisfy a product specification, is considered as a fail and is shown as "Unacceptable" in Table 1.

(Measurement of Area Ratio of Crystal Grains Oriented at Deviation Angle of Less than or Equal to 12.5° from Cube Orientation in Cross Section Perpendicular to Rolling Direction)

The area ratio in the crystal orientation (Cube orientation) was measured/analyzed in the same method as the method described in "Description of the Embodiments" in the present specification.

(Measurement of 0.2% Yield Strength)

In measuring the 0.2% yield strength, the heating condition was set at 105° C. for 48 hours by converting a treatment condition in a case where a resin with an adhesive is laminated to a low temperature side using the Larson-Miller parameter. As the 0.2% yield strength of the copper foils in the Examples and Comparative Examples, three samples were measured, and the average value thereof is shown. A conductor has this 0.2% yield strength when incorporated into an SRC, and the test was conducted taking presumed thermal energy into consideration. The strength test condition was in accordance with JIS Z 2241:2011, and a tensile test was conducted in a longitudinal direction. However, with respect to the shape, the test was not in accordance with JIS, the length of each conductor was made 160 mm, by which a gauge length of 100 mm could be taken sufficiently, and, with respect to the transverse direction, the test was conducted with the original shape as it was. A case satisfying a 0.2% yield strength of greater than or equal to 250 MPa was considered as a pass, and a case of a 0.2% yield strength of less than 250 MPa was considered a fail.

The results obtained by conducting the measurement and evaluation by the methods as described above are shown in Table 1. In Table 1, the results for the copper foils each having a width of 0.5 mm are shown as Examples. Note that, in the Examples and Comparative Examples, the results for the copper foils each having a width of 0.8 mm, 1.1 mm, or 1.4 mm showed the same tendency as that for the copper foils each having a width of 0.5 mm shown in Table 1, and therefore the description is omitted.

TABLE 1

| | | Manufacturing conditions | | | | | | |
|---|---|---|---|---|---|---|---|---|
| | | Second cold rolling step | Second heat treatment step | | Third cold rolling step | Third cold rolling step | | |
| | Kind of alloy (numbers represent % by mass) | Reduction of area (%) | Heating temperature (°C.) | Retention time | Reduction of area (%) | Heating temperature (°C.) | Retention time (s) | Larson-Miller parameter |
| Example 1 | TPC | 85 | 350 | 5 s | 5 | — | — | 7500 |
| Example 2 | TPC | 75 | 350 | 5 s | 10 | 160 | 10 | 7500 |
| Example 3 | TPC | 95 | 200 | 2 h | 15 | — | — | 7500 |
| Example 4 | TPC | 98 | 250 | 5 s | 25 | 160 | 10 | 7500 |
| Example 5 | TPC | 80 | 200 | 2 h | 40 | 160 | 10 | 7500 |
| Example 6 | OFC | 90 | 300 | 5 s | 30 | 160 | 10 | 7500 |
| Example 7 | Cu—0.02Ag | 85 | 300 | 5 s | 25 | 160 | 10 | 7500 |
| Example 8 | Cu—0.05Sn | 90 | 450 | 5 s | 10 | 200 | 10 | 7500 |
| Example 9 | Cu—0.02Mg | 95 | 500 | 10 s | 15 | 200 | 10 | 7500 |
| Example 10 | Cu—0.1Zn | 75 | 250 | 2 h | 20 | 160 | 10 | 7500 |
| Example 11 | Cu—0.005P | 90 | 450 | 10 s | 45 | 160 | 10 | 7500 |
| Example 12 | Cu—0.02Cr | 95 | 500 | 10 s | 30 | 220 | 10 | 7500 |
| Example 13 | Cu—0.02Si | 85 | 500 | 10 s | 25 | 240 | 10 | 7500 |
| Example 14 | Cu—0.02Zr | 90 | 550 | 10 s | 30 | 220 | 10 | 8500 |
| Example 15 | Cu—0.02Ti | 85 | 500 | 10 s | 25 | 220 | 10 | 8500 |
| Example 16 | Cu—0.02Fe | 80 | 500 | 10 s | 35 | 240 | 10 | 7500 |
| Example 17 | Cu—0.15Sn | 85 | 500 | 10 s | 15 | 240 | 10 | 7500 |
| Example 18 | Cu—0.7Sn | 90 | 550 | 10 s | 10 | 240 | 10 | 7500 |
| Example 19 | Cu—0.25Cr—0.2Sn—0.15Zn | 85 | 600 | 2 h | 10 | 240 | 10 | 8500 |
| Example 20 | Cu—0.25Cr—0.1Mg | 90 | 600 | 2 h | 15 | 240 | 10 | 7500 |
| Example 21 | Cu—1.5Sn | 85 | 350 | 5 s | 20 | 250 | 10 | 8500 |
| Example 22 | TPC | 75 | 400 | 5 s | 20 | — | — | 7500 |
| Example 23 | TPC | 80 | 400 | 5 s | 20 | — | — | 7500 |
| Example 24 | TPC | 95 | 400 | 5 s | 25 | — | — | 7500 |
| Comparative Example 1 | TPC | 45 | 250 | 5 s | 25 | 160 | 10 | 7500 |
| Comparative Example 2 | TPC | 85 | — | — | — | — | — | 7500 |
| Comparative Example 3 | TPC | 75 | 150 | 10 s | 15 | 250 | 10 | 7500 |
| Comparative Example 4 | OFC | 80 | 700 | 10 s | 20 | 250 | 10 | 7500 |
| Comparative Example 5 | TPC | 90 | 350 | 5 s | — | — | — | 7500 |
| Comparative Example 6 | TPC | 50 | 300 | 10 s | 30 | — | — | 7500 |
| Comparative Example 7 | TPC | 80 | 800 | 20 min | 95 | — | — | 7500 |

| | Final copper foil thickness (mm) | Area ratio of crystal grains oriented at deviation angle of 12.5° or less from Cube orientation in RD surface (%) | Performance evaluation | | | |
|---|---|---|---|---|---|---|
| | | | 0.2% Yield strength (MPa) | Flex resistance | | Electric resistance |
| | | | | Bend radius R = 7.5 mm | Bend radius R = 5.5 mm | |
| Example 1 | 0.035 | 45 | 310 | Acceptable | Acceptable | Acceptable |
| Example 2 | 0.035 | 25 | 320 | Acceptable | Acceptable | Acceptable |
| Example 3 | 0.035 | 90 | 320 | Acceptable | Acceptable | Acceptable |
| Example 4 | 0.035 | 90 | 340 | Acceptable | Acceptable | Acceptable |
| Example 5 | 0.035 | 25 | 360 | Acceptable | Acceptable | Acceptable |
| Example 6 | 0.035 | 75 | 350 | Acceptable | Acceptable | Acceptable |
| Example 7 | 0.035 | 25 | 340 | Acceptable | Acceptable | Acceptable |
| Example 8 | 0.035 | 15 | 360 | Acceptable | Acceptable | Acceptable |

TABLE 1-continued

| | | | | | | |
|---|---|---|---|---|---|---|
| Example 9 | 0.035 | 12 | 350 | Acceptable | Acceptable | Acceptable |
| Example 10 | 0.035 | 25 | 350 | Acceptable | Acceptable | Acceptable |
| Example 11 | 0.035 | 20 | 370 | Acceptable | Acceptable | Acceptable |
| Example 12 | 0.035 | 15 | 360 | Acceptable | Acceptable | Acceptable |
| Example 13 | 0.035 | 10 | 350 | Acceptable | Acceptable | Acceptable |
| Example 14 | 0.035 | 10 | 390 | Acceptable | Acceptable | Acceptable |
| Example 15 | 0.035 | 10 | 370 | Acceptable | Acceptable | Acceptable |
| Example 16 | 0.035 | 9 | 380 | Acceptable | Acceptable | Acceptable |
| Example 17 | 0.035 | 15 | 360 | Acceptable | Acceptable | Acceptable |
| Example 18 | 0.035 | 8 | 380 | Acceptable | Acceptable | Acceptable |
| Example 19 | 0.035 | 10 | 420 | Acceptable | Acceptable | Acceptable |
| Example 20 | 0.035 | 10 | 450 | Acceptable | Acceptable | Acceptable |
| Example 21 | 0.035 | 8 | 420 | Acceptable | Acceptable | Acceptable |
| Example 22 | 0.020 | 20 | 330 | Acceptable | Acceptable | Acceptable |
| Example 23 | 0.030 | 50 | 320 | Acceptable | Acceptable | Acceptable |
| Example 24 | 0.045 | 75 | 280 | Acceptable | Acceptable | Acceptable |
| Comparative Example 1 | 0.035 | 6 | 330 | Acceptable | Unacceptable | Acceptable |
| Comparative Example 2 | 0.035 | 0 | 450 | Acceptable | Unacceptable | Acceptable |
| Comparative Example 3 | 0.035 | 90 | 140 | Acceptable | Unacceptable | Acceptable |
| Comparative Example 4 | 0.035 | 65 | 230 | Acceptable | Unacceptable | Acceptable |
| Comparative Example 5 | 0.035 | 90 | 150 | Acceptable | Unacceptable | Acceptable |
| Comparative Example 6 | 0.035 | 6 | 360 | Acceptable | Unacceptable | Acceptable |
| Comparative Example 7 | 0.035 | 90 | 140 | Acceptable | Unacceptable | Acceptable |

From the results shown in Table 1, it was found that for any of Examples 1 to 24, the 0.2% yield strength was greater than or equal to 250 MPa, the area ratio of particular crystal grains oriented in the orientation at a deviation angle of less than or equal to 12.5° from the Cube orientation in the cross section perpendicular to the rolling direction was greater than or equal to 8%, and the flex life cycle was 500000 times or more both at a bend radius of 5.5 mm and of 7.5 mm and therefore the flex resistance was good.

On the other hand, for Comparative Example 1, the reduction of area in the second cold rolling step was low, so that said area ratio of particular crystal grains was out of the scope of the present disclosure, and the life flex cycle at a bend radius of 5.5 mm was less than 500000 times and therefore the flex resistance was insufficient. In addition, in Comparative Example 2, the second heat treatment step, the third cold rolling step, and the third heat treatment step were not conducted, so that said area ratio of the particular crystal grains were out of the scope of the present disclosure, and the flex life cycle at a bend radius of 5.5 mm was less than 500000 times and therefore the flex resistance was insufficient.

In Comparative Example 3, the heating temperature in the second heat treatment step was low, so that the 0.2% yield strength was out of the scope of the present disclosure, and the flex life cycle at a bend radius of 5.5 mm was less than 500000 times and therefore the flex resistance was insufficient. In Comparative Example 4, a material (OFC) different from the TPC was used, and the heating temperature in the second heat treatment step was high, so that the 0.2% yield strength was out of the scope of the present disclosure, and the flex life cycle at a bend radius of 5.5 mm was less than 500000 times and therefore the flex resistance was insufficient.

In Comparative Example 5, although the third cold rolling step was not conducted, the 0.2% yield strength was out of the scope of the present disclosure, and the flex life cycle at a bend radius of 5.5 mm was less than 500000 times and therefore the flex resistance was insufficient.

Comparative Example 6 corresponds to Examples described in Japanese Laid-Open Patent Publication No. 2009-048819, and the reduction of area in the second cold rolling step was low, so that said area ratio of particular crystal grains was out of the scope of the present disclosure, and the flex life cycle at a bend radius of 5.5 mm was less than 500000 times and therefore the flex resistance was insufficient. Comparative Example 7 corresponds to Examples described in Japanese Patent No. 3009383, and the heating temperature in the second heat treatment step was high, so that the 0.2% yield strength was out of the scope of the present disclosure, and the flex life cycle at a bend radius of 5.5 mm was less than 500000 times and therefore the flex resistance was insufficient.

Accordingly, it was found that when a narrow width copper foil having a width of 0.5 mm to 1.4 mm is made by rolling a copper ingot, the flex life cycle until the resistance value increases by 3Ω becomes 500000 times or more, the flex resistance becomes excellent, and a long lifetime can be realized by making the area ratio of crystal grains oriented in the orientation at a deviation angle of less than or equal to 12.5° from the Cube orientation in the cross section perpendicular to the rolling direction of the rectangular rolled copper foil greater than or equal to 8%. In addition, it was confirmed that the above findings not only hold for tough pitch copper (TPC), but similarly hold for oxygen-free copper (OFC) or a copper alloy containing a total of less than or equal to 1.3% by mass of one or two or more elements selected from among Mg, Zn, Sn, Ag, P, Cr, Si, Zr, Ti, and Fe.

As described above, it was confirmed that the present disclosure exhibits excellent effects.

The rectangular rolled copper foil of the present disclosure is excellent in flex resistance and therefore can be suitably used as a flexible flat cable (FFC). Particularly, the rectangular rolled copper foil of the present disclosure can be suitably used for a rotary connector (SRC), which is a component of an air bag system in automobiles, and automotive components such as a roof harness, a door harness, and a floor harness.

What is claimed is:

1. A rectangular rolled copper foil comprising copper or a copper alloy having a 0.2% yield strength of greater than or equal to 250 MPa, wherein, in a cross section perpendicular to a rolling direction, an area ratio of crystal grains oriented at a deviation angle of less than or equal to 12.5° from a Cube orientation is greater than or equal to 8% and less than or equal to 90%, wherein a lattice defect is introduced in a structure of a matrix of the rectangular rolled copper foil, and an average crystal particle diameter of the rectangular rolled copper foil is 1 µm to 10 µm.

2. The rectangular rolled copper foil according to claim 1, wherein the rectangular rolled copper foil is a copper alloy comprising a total of less than or equal to 1.5% by mass of one or two or more elements selected from the group consisting of Mg, Zn, Sn, P, Cr, Si, Zr, Ti, and Fe, with the balance being copper and inevitable impurities; and wherein in a case Mg is present in the copper alloy the Mg is present between 0.01 to 0.2% by mass,
wherein in a case Zn is present in the copper alloy the Zn is present between 0.01 to 0.5% by mass,
wherein in a case Sn is present in the copper alloy the Sn is present between 0.01 to 1.5% by mass,
wherein in a case Ag is present in the copper alloy the Ag is present between 0.01 to 0.1% by mass,
wherein in a case P is present in the copper alloy the P is present between 0.001 to 0.05% by mass,
wherein in a case Cr is present in the copper alloy the Cr is present between 0.1 to 0.5% by mass,
wherein in a case Si is present in the copper alloy the Si is present between 0.01 to 0.1% by mass,
wherein in a case Zr is present in the copper alloy the Zr is present between 0.01 to 0.2% by mass,
wherein in a case Ti is present in the copper alloy the Ti is present between 0.01 to 0.2% by mass, and
wherein in a case Fe is present the copper alloy the Fe is present between 0.01 to 0.2% by mass.

3. The rectangular rolled copper foil according to claim 1, wherein the rectangular rolled copper foil is a copper alloy comprising a total of less than or equal to 1.0% by mass of one or two or more elements selected from the group consisting of Mg, Zn, Sn, P, Cr, Si, Zr, Ti, and Fe, with the balance being copper and inevitable impurities; and wherein in a case Mg is present in the copper alloy the Mg is present between 0.01 to 0.2% by mass,
wherein in a case Zn is present in the copper alloy the Zn is present between 0.01 to 0.5% by mass,
wherein in a case Sn is present in the copper alloy the Sn is present between 0.01 to 1.0% by mass,
wherein in a case Ag is present in the copper alloy the Ag is present between 0.01 to 0.1% by mass,
wherein in a case P is present in the copper alloy the P is present between 0.001 to 0.05% by mass,
wherein in a case Cr is present in the copper alloy the Cr is present between 0.1 to 0.5% by mass,
wherein in a case Si is present in the copper alloy the Si is present between 0.01 to 0.1% by mass,
wherein in a case Zr is present in the copper alloy Zr is present between 0.01 to 0.2% by mass,
wherein in a case Ti is present in the copper alloy the Ti is present between 0.01 to 0.2% by mass, and
wherein in a case Fe is present in the copper alloy the Fe is present between 0.01 to 0.2% by mass.

4. The rectangular rolled copper foil according to claim 1, wherein a 0.2% yield strength of greater than or equal to 250 MPa is maintained even in a state where heat treatment has been conducted under a condition of C=20 and in a range of P=7000 to 9000, where
P is a Larson-Miller parameter defined by P=T(C+log tr),
T represents absolute temperature (K),
tr represents rupture time (h), and
C represents a material constant.

5. A flexible flat cable comprising the rectangular rolled copper foil according to claim 1.

6. A rotary connector comprising the flexible flat cable according to claim 5, the rotary connector being applicable to a bent portion of the flexible flat cable having a bend radius of less than or equal to 6 mm.

* * * * *